(12) United States Patent
Kitamura

(10) Patent No.: US 9,778,781 B2
(45) Date of Patent: Oct. 3, 2017

(54) TOUCH PANEL APPARATUS PROVIDED WITH TOUCH PANEL ALLOWABLE FLICK OPERATION, IMAGE FORMING APPARATUS, AND OPERATION PROCESSING METHOD

(71) Applicant: KYOCERA Document Solutions Inc., Osaka (JP)

(72) Inventor: Tetsuro Kitamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 58 days.

(21) Appl. No.: 14/694,671

(22) Filed: Apr. 23, 2015

(65) Prior Publication Data
US 2015/0309654 A1 Oct. 29, 2015

(30) Foreign Application Priority Data
Apr. 23, 2014 (JP) .................................. 2014-089045

(51) Int. Cl.
G06F 3/041 (2006.01)
G06F 3/0481 (2013.01)
G06F 3/0488 (2013.01)

(52) U.S. Cl.
CPC .......... *G06F 3/0416* (2013.01); *G06F 3/0488* (2013.01); *G06F 3/04817* (2013.01)

(58) Field of Classification Search
CPC ... G06F 3/0416; G06F 3/04817; G06F 3/0488
See application file for complete search history.

(56) References Cited

U.S. PATENT DOCUMENTS 7,302,649 B2* 11/2007 Ohnishi ................ G06F 3/0486
715/769
9,485,351 B2* 11/2016 Kobayashi .......... H04M 1/6041
(Continued)

FOREIGN PATENT DOCUMENTS

CN 1841294 A 10/2006
CN 102047211 A 5/2011
(Continued)

OTHER PUBLICATIONS

Baudisch et al: "Drag-and Pop and Drag-and-Pick: Techniques for Accessing Remote Screen Content on Touch-and Pen-Operated Systems", Human-Computer Interaction / Interract '03, IFIP TC.13 International Conference on Human-Computer Interaction, Sep. 1-5, 2003, Zurich, Switzerland, IOS Press, Amsterdam, NL, Sep. 1, 2003 (Sep. 1, 2003), p. 57-64, XP002618610, ISBN: 978-1-58603-363-7.

*Primary Examiner* — Afroza Chowdhury
(74) *Attorney, Agent, or Firm* — Hawaii Patent Services; Nathaniel K. Fedde; Kenton N. Fedde

(57) ABSTRACT

Provided is a touch panel apparatus that matches a flicked icon with an icon that a user meant, even if a flick direction of the flicked icon is ambiguous. The touch panel apparatus has a touch panel and an operation processing part. On the touch panel, a movement source icon and a plurality of movement destination icons are displayed. The movement source icon is movable to a flick direction by flick operation. The plurality of movement destination icons serve as a movement destination of the movement source icon. In each of the plurality of movement destination icons, a decision range for determining as the movement destination icon to the flick direction is provided. An operation processing part acquires the movement destination icon having the decision (Continued)

range to the flick direction of the movement source icon as a movement destination candidate.

9 Claims, 6 Drawing Sheets

(56) References Cited

U.S. PATENT DOCUMENTS

| | | | | |
|---|---|---|---|---|
| 2001/0024212 A1* | 9/2001 | Ohnishi | ............. | G06F 3/04817 715/769 |
| 2006/0248476 A1 | 11/2006 | Yamada | | |
| 2007/0050726 A1* | 3/2007 | Wakai | ................. | G06F 3/0486 715/769 |
| 2009/0276701 A1 | 11/2009 | Nurmi | | |
| 2011/0084925 A1* | 4/2011 | Baik | ................. | G06F 3/04817 345/173 |
| 2011/0252350 A1* | 10/2011 | Chaudhri | ........... | G06F 3/04817 715/769 |
| 2011/0279363 A1* | 11/2011 | Shoji | ................. | G06F 3/04886 345/156 |
| 2013/0021243 A1* | 1/2013 | Lea | ..................... | G06F 3/04812 345/157 |
| 2013/0088449 A1* | 4/2013 | Kurumasa | ........... | G06F 3/04883 345/173 |
| 2013/0162575 A1* | 6/2013 | Kaigawa | ............... | G06F 3/0412 345/173 |
| 2013/0268895 A1* | 10/2013 | Yamaki | ............... | G06F 3/04817 715/835 |
| 2014/0149903 A1* | 5/2014 | Ahn | ..................... | G06F 3/0488 715/765 |
| 2014/0317555 A1* | 10/2014 | Choi | .................. | G06F 3/04817 715/781 |

FOREIGN PATENT DOCUMENTS

| | | |
|---|---|---|
| CN | 103279304 A | 9/2013 |
| JP | 2007-286700 A | 11/2007 |
| JP | 2011-145881 A | 7/2011 |
| JP | 2011-253230 A | 12/2011 |
| JP | 2012-073995 A | 4/2012 |
| JP | 2013-196267 A | 9/2013 |
| WO | WO2011045805 A1 | 4/2011 |

* cited by examiner

TOUCH PANEL APPARATUS PROVIDED WITH TOUCH PANEL ALLOWABLE FLICK OPERATION, IMAGE FORMING APPARATUS, AND OPERATION PROCESSING METHOD

INCORPORATION BY REFERENCE

This application is based on and claims the benefit of priority from Japanese Patent Application No. 2014-089045 filed on Apr. 23, 2014, the contents of which are hereby incorporated by reference.

BACKGROUND

The present disclosure is related with a touch panel apparatus provided with a touch panel that can be flick operated, an image forming apparatus, and an operation processing method.

In recent years, there is a touch panel that accepts a flick operation to slide as a screen is flicked with a finger. Also, there is a touch panel that can be flick operated about an icon displayed on the screen. For example, a manuscript icon that indicates manuscript data, and a plurality of function icons corresponding to functions, such as printing and FAX, are displayed on the screen. In this case, a technology is proposed that a user can be flicked the manuscript icon towards the desired function icon. In the technology, the flicked manuscript icon and the function icon located in the flick direction are matched. Then, the data of the manuscript icon is printed or the like by function corresponding to the function icon.

SUMMARY

The touch panel apparatus of the present disclosure is provided with a touch panel and an operation processing part. On the touch panel, a movement source icon and a plurality of movement destination icons are displayed. The movement source icon is movable in flick direction by flick operation. The plurality of movement destination icons serve as a movement destination of the movement source icon. In each of the plurality of movement destination icons, a decision range is provided for determining the movement destination icon corresponding to the flick direction. The operation processing part acquires the movement destination icon that has the decision range in the flick direction of the movement source icon as a movement destination candidate of the movement source icon. The image forming apparatus of the present disclosure equipped the above with the touch panel apparatus of the description.

An operation processing method of the present disclosure is executed by a touch panel apparatus provided with a touch panel. A movement source icon and a plurality of movement destination icons are displayed on the touch panel. The movement source icon is movable in flick direction by flick operation. The plurality of movement destination icons serve as a movement destination of the movement source icon. In each of the plurality of movement destination icons, a decision range is provided for determining the movement destination icon corresponding to the flick direction. The movement destination icon that has the decision range in the flick direction of the movement source icon is acquired as a movement destination candidate of the movement source icon.

DETAILED DESCRIPTION

Hereinafter, with reference to figures, an embodiment in the present disclosure is described in detail. In the following embodiment, same numerals are given to a configuration that indicates a similar function.

Figure 1:
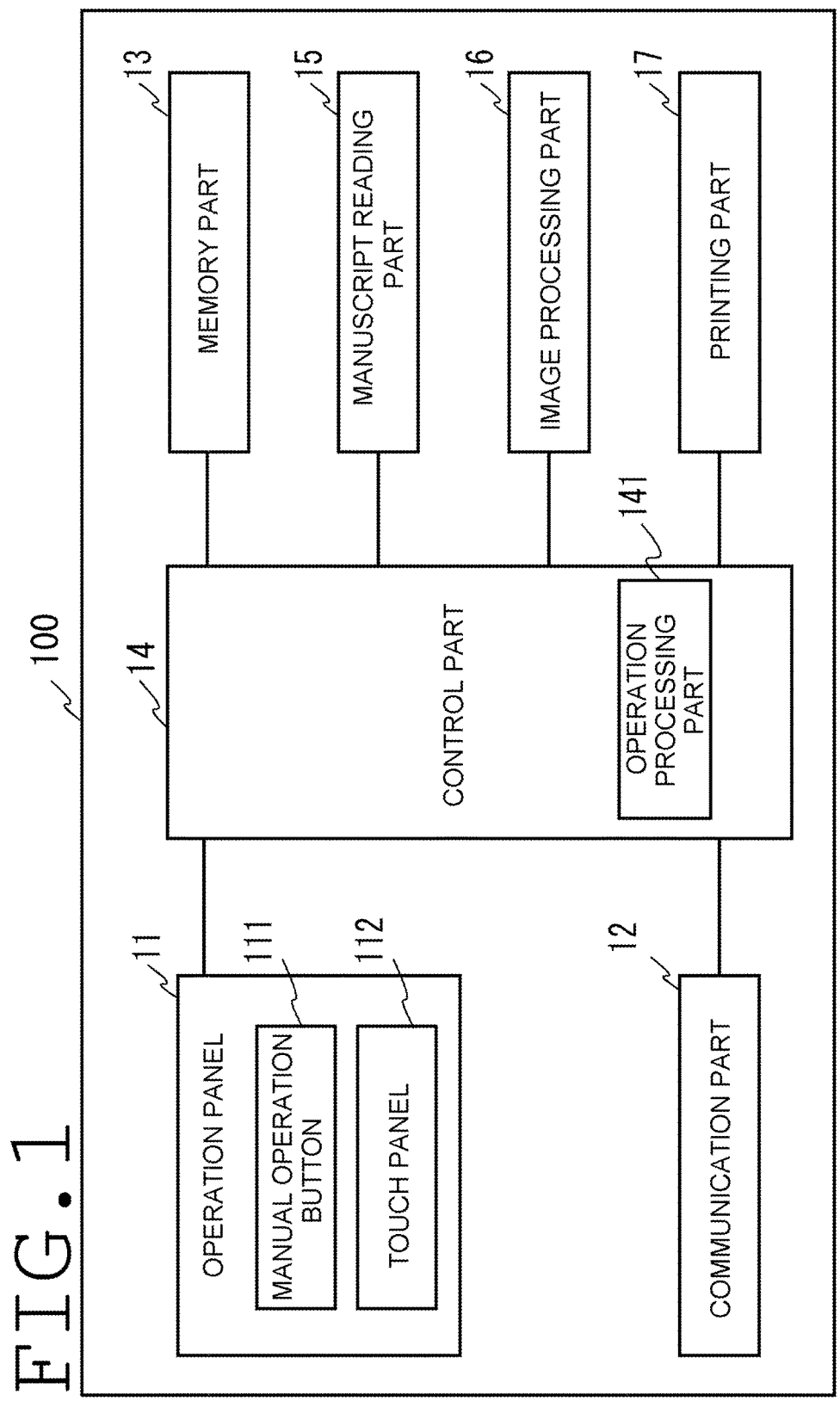
FIG. 1 is a block diagram indicating a configuration of the image forming apparatus in the embodiment related to the present disclosure.

As shown in FIG. 1, image forming apparatus 100 includes operation panel 11, communication part 12, memory part 13, control part 14, manuscript reading part 15, image processing part 16, and printing part 17.

Operation panel 11 has touch panel 112 and manual operation button 111. Touch panel 112 functions as the display part and an input part. In touch panel 112, a transparent pressure-sensitive sensor is provided on a surface of the display part that displays various operation keys and an image formation situation. Touch panel 112 detects a touch operation to the display surface and outputs a signal corresponding to the position where touch operation is detected. Thereby, the operation to the operation key displayed on the display part is accepted. In addition, in touch operation, the flick operation that slide quickly so that a display surface is flipped is included. Also, manual operation button 111 has various operation keys. These various operation keys include a numeric keypad, a reset key, a stop key, a start key, or the like. The numeric keypad is a group of keys for inputting numerical values, such as printing number of sheets. The reset key is a key for inputting an instruction that make setup information initialize. The stop key is a key for stopping a copying operation. The start key is a key for inputting an output instruction that makes print operation start.

Communication part 12 has a function that transmits and receives various data to an external terminal via a network.

Memory part 13 is a non-transitory recording medium. Memory part 13 accumulates an image data read by manuscript reading part 15 and an image data received via communication part 12.

Manuscript reading part 15 is a scanner. Manuscript reading part 15 irradiates light to a manuscript fed by a manuscript sheet feeding device, which is not illustrated, a manuscript placed on platen glass by a user. Manuscript reading part 15 receives reflected light, reads a manuscript image, and outputs the image data.

Image processing part 16 performs image processing to the image data. Image processing part 16, for example, executes a scaling process and an image improvement process. The image improvement processes are density control, gradation adjustment, or the like.

Printing part 17 is a printing part that prints the image data. Printing part 17, for example, forms a latent image on the surface of a photo conductor drum based on the image data read from memory part 13. Printing part 17 performs image formation that makes the latent image a toner image with toner. Printing part 17 makes the recording paper conveyed from the feeding part, which is not illustrated, transfer the toner image of the photo conductor drum. Printing part 17 fixes the toner image to the recording paper and discharges it.

Control part 14 is connected to operation panel 11, communication part 12, memory part 13, manuscript reading part 15, image processing part 16, and printing part 17, respectively. Control part 14 executes operation controlling of the entire devices of image forming apparatus 100 according to an instruction information input from operation panel 11. Control parts 14 are information processing parts, such as a microcomputer having a non-transitory recording medium. The control program for operation controlling image forming apparatus 100 is memorized in the recording medium. Control part 14 reads the memorized control program and expands the control program. Thereby, control part 14 controls a whole device according to the instructions information input from operation panel 11. In addition, a control program may be memorized in the recording medium of control part 14 via an unillustrated network or un-illustrated recording medium that can read by a computer, Also, control part 14 operates as operation processing part 141 that performs operation control of the operation screen displayed on touch panel 112.

Figure 2:
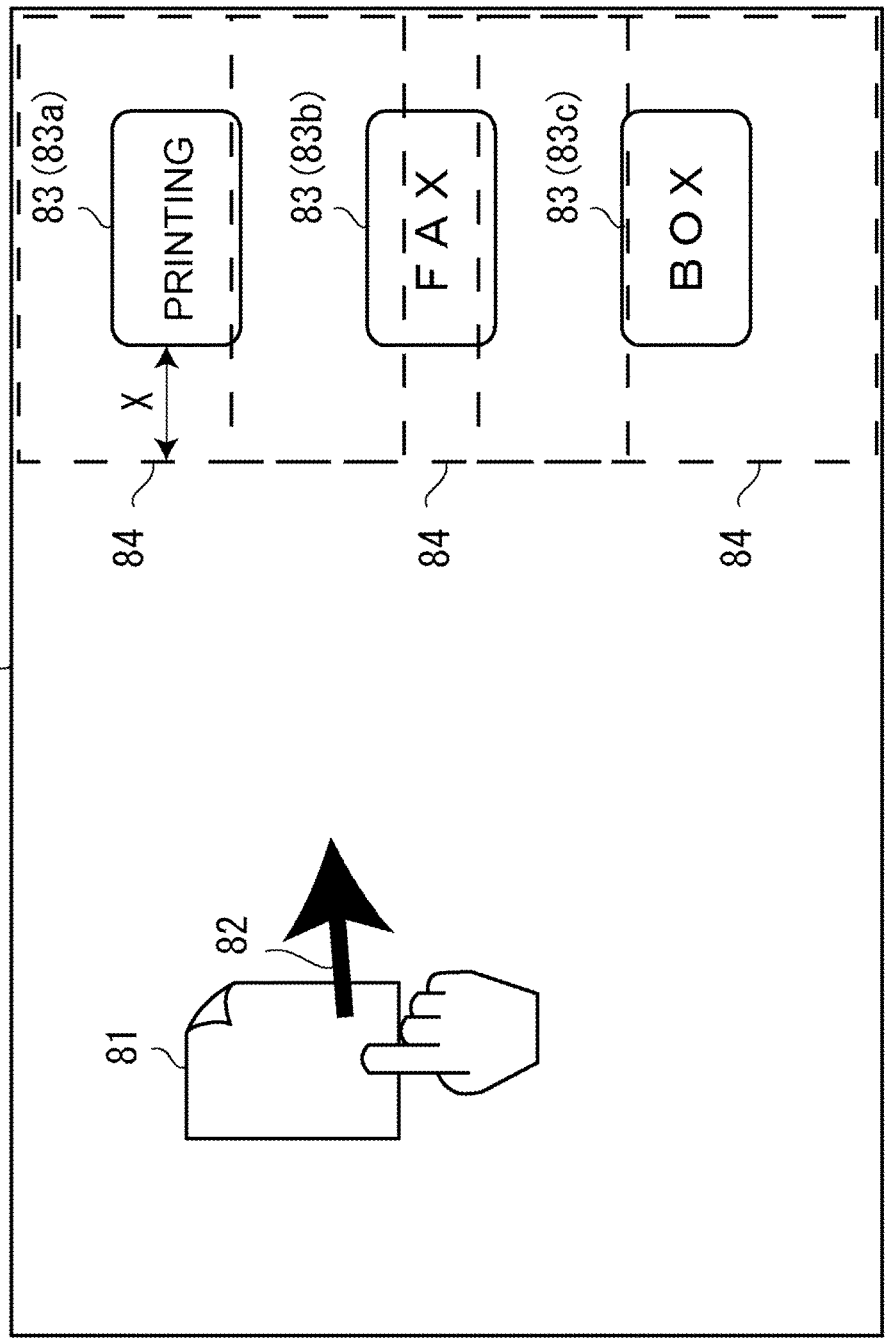
FIG. 2 shows an example of an operation screen displayed on an operation panel illustrated in FIG. 1.

FIG. 2 shows an example of operation screen 80 displayed on touch panel 112. In operation screen 80, image icon 81 corresponding to the image data and a plurality of functional folders (printing folder 83a, FAX folder 83b, BOX folder 83c) are icon-displayed. In each of the plurality of functional folders corresponds to each function of the image forming apparatus. If it does not need to be distinguished each functional folder, it is just explained as functional folder 83.

The image data of image icon 81 is image data read by manuscript reading part 15 or image data memorized in memory part 13. Printing folder 83a corresponds to a function that prints the image data into that it was put by the folder. FAX folder 83b corresponds to a function that performs FAX transmission of the image data put in the folder. Also, BOX folder 83c corresponds to a function that memorizes the image data put in the folder to preassigned storage area in memory part 13.

Image icon 81 is configured movable on the screen by the flick operation. If image icon 81 is flicked, it will move to flick direction 82. The user can flick image icon 81, which has been flicked, once more. Thereby, it is also possible to correct the movement direction of image icon 81. Image icon 81 moves and overlaps with functional folder 83. In that case, image icon 81 and overlapped functional folder 83 are matched. Then, the image data of image icon 81 is stored in the matched functional folder 83. The image data stored in functional folder 83 is processed by a contents according to the function of the functional folder 83. For example, if image icon 81 moves and overlaps with printing folder 83a, the image data corresponding to image icon 81 is printed.

Also, to the surroundings of each functional folder 83, decision range 84 for determining whether it is functional folder 83 corresponding to flick direction 82 is set. Flick direction 82 shows the movement direction of image icon 81. Operation processing part 141 makes functional folder 83, which has decision range 84 to flick direction 82, consider as a movement destination candidate of image icon 81. Thereby, operation processing part 141 supports to difference (ambiguity) of flick direction 82 accompanying user operation. If there is no decision range 84 to flick direction 82, an error message is displayed so that it may be re-flicked.

Decision range 84, set to the outer circumference of functional folder 83, which is separated only specific distance X from functional folder 83. As specific distance X is larger, it can support to a large difference of flick direction 82. On the contrary, as specific distance X becomes smaller, it will not correspond to the difference of flick direction 82, and an exact flick operation is needed. Also, as specific distance X is larger, decision range 84 of each functional folder 83 is larger, and each of decision range 84 of functional folder 83 may overlap. Therefore, even if some of functional folder 83 are arranged nearby, it can be supported. For example, even if the flick direction 82 comes between each of adjoining functional folder 83, each of adjoining functional folder 83 can be the movement destination candidate of image icon 81. In addition, specific distance X may be set up previously, or a user can be set according to preference.

Figure 3:
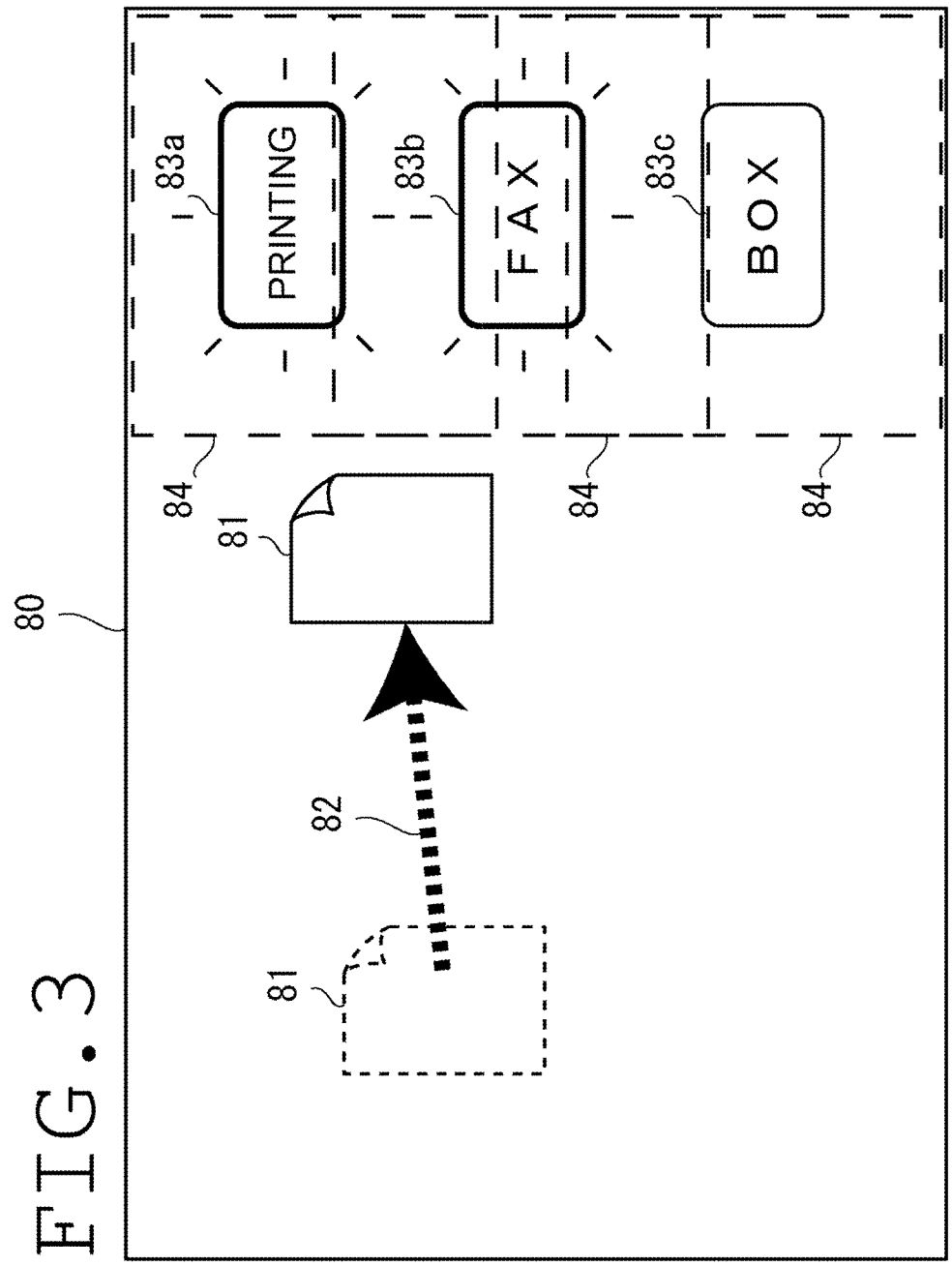
FIG. 3 shows an example of the operation screen displayed on the operation panel illustrated in FIG. 1.

As shown in FIG. 3, a case where there are a plurality of movement destination candidates (83a, 83b) on flick direction 82 is considered. Operation processing part 141 stops movement of image icon 81 near functional folders (83a, 83b) for the plurality of movement destination candidates. Therefore, a user can flick operate image icon 81 near functional folders (83a, 83b) for the plurality of movement destination candidates. Therefore, it becomes easy to make image icon 81 flick accurately towards desired functional folder 83. Also, functional folder (83a, 83b) of the movement destination candidate is displayed with highlighting by blinking, or the like. Thereby, it performs for making is a user recognize a movement destination candidate easily. In addition, also in case that the number of movement destination candidates is only one, blinking of functional folder 83 for the movement destination candidate is performed. In addition, functional folder 83 that is the movement destination candidate may be enlarged display than functional folder 83 that is not the movement destination candidate, Also, in this case, others may not be overlapped with functional folder 83 that has been performed enlarged display. For example, the reduced display of the size for the other functional folders 83 may be performed, or display positions may be changed.

Figure 4:
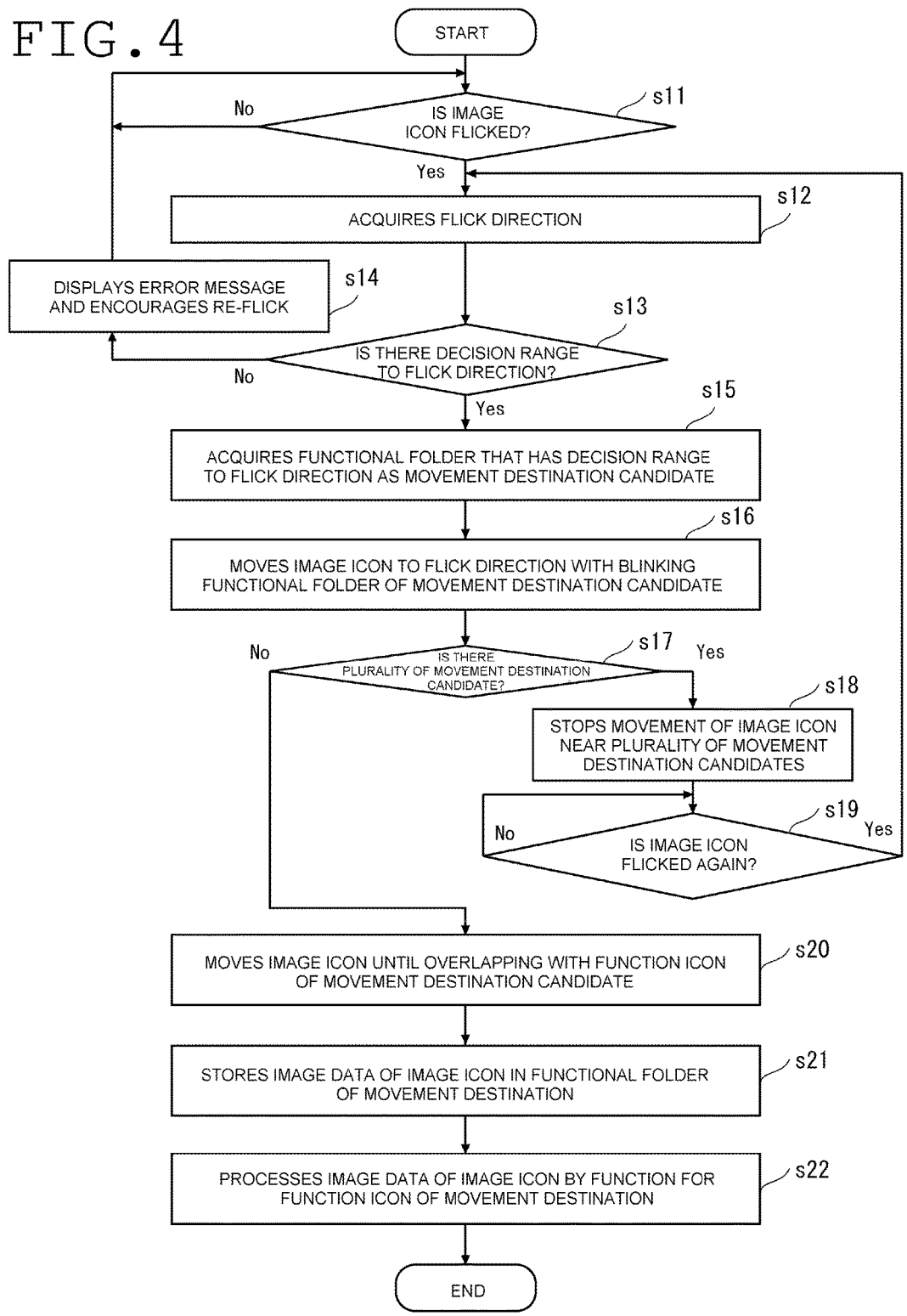
FIG. 4 is a flow chart that indicates a process flow of an operation processing part illustrated in FIG. 1.

In detail, with reference to FIG. 4, the process flow of the above-mentioned operation processing part 141 is explained.

Operation processing part 141 determines whether or not image icon 81 is flicked (Step s11). If operation processing part 141 is not flicked (No at Step s11), it returns a process to Step s11. If image icon 81 is flicked (Yes at Step s11), operation processing part 141 will acquire flick direction 82 (Step s12). Then, operation processing part 141 determines whether or not decision range 84 is to flick direction 82 (Step s13).

If there is no decision range 84 to flick direction 82 (No at Step s13), operation processing part 141 displays an error message and encourages the user to flick operate, again (Step s14). Then, operation processing part 141 returns a process to Step s11. On the other hand, if there is decision range 84 to flick direction 82 (Yes at Step s13), operation processing part 141 acquires functional folder 83 that has decision range 84 to flick direction 82 as a movement destination candidate (Step s15). Operation processing part 141 moves image icon 81 to flick direction 82. Also, operation processing part 141 performs blinking of functional folder 83 for the movement destination candidate (Step s16).

Continuing, operation processing part 141 determines whether or not there are a plurality of movement destination candidates (Step s17). If there are a plurality of movement destination candidate (Yes at Step s17), operation processing part 141 stops image icon 81 near the plurality of movement destination candidates (Step s18). Then, operation processing part 141 waits until stopped image icon 81 is re-flicked (Step s19). If stopped image icon 81 is re-flicked (Yes at Step s19), operation processing part 141 returns a process to Step s12. In addition, when making stopped image icon 81 re-flick, decision range 84 of each functional folder 83 may be reduced display to the range that does not overlap, mutually. Because distance X between image icon 81 and functional folder 83 is near, it is easy to flick accurately.

On the other hand, if there are not a plurality of movement destination candidate (No at Step s17), a movement destination candidate is set to only one. In this case, operation processing part 141 moves image icon 81 until it overlaps with functional folder 83 of the movement destination candidate (Step s20). If image icon 81 overlaps with functional folder 83, operation processing part 141 stores the image data of image icon 81 into functional folder 83 for the movement destination (Step s21). Then, operation processing part 141 processes the image data by the function corresponding to functional folder 83 of the movement destination (Step s22) and ends the present process.

Thus, in the present embodiment, decision range 84 is set to each functional folder 83. Operation processing part 141 acquires functional folder 83 that has decision range 84 to flick direction 82 of image icon 81 as a movement destination candidate of image icon 81. Therefore, even if flick direction 82 deviated slightly, it can cover in decision range 84 provided in functional folder 83. Also, in the present embodiment, if there are a plurality of movement destination candidates, image icon 81 is stopped near the plurality of movement destination candidates. Then, by making re-flick image icon 81 again, it is trying to move to desired functional folder 83. Therefore, the movement direction of image icon 81 is correctable. Therefore, image icon 81 can be matched with desired functional folder 83.

As it explains in detail, with typical technology, if a plurality of function icons are arranged to a flick direction, a manuscript icon is unable to be accurately flicked towards a desired function icon. In this case, a manuscript icon will be matched with the function icon that is not intended. Therefore, the unexpected function will be executed.

On contrary, according to the present disclosure, even if the flick direction of the icon, which is flick operated, is ambiguous, it can be supported. That is, the technology can be provided that the flicked icon can match with the icon, which the user intends.

It cannot be overemphasized that it can change of all sorts in the range that the present disclosure is not limited to the embodiment as mentioned above and does not deviate from the aim of the present disclosure.

Figure 5:
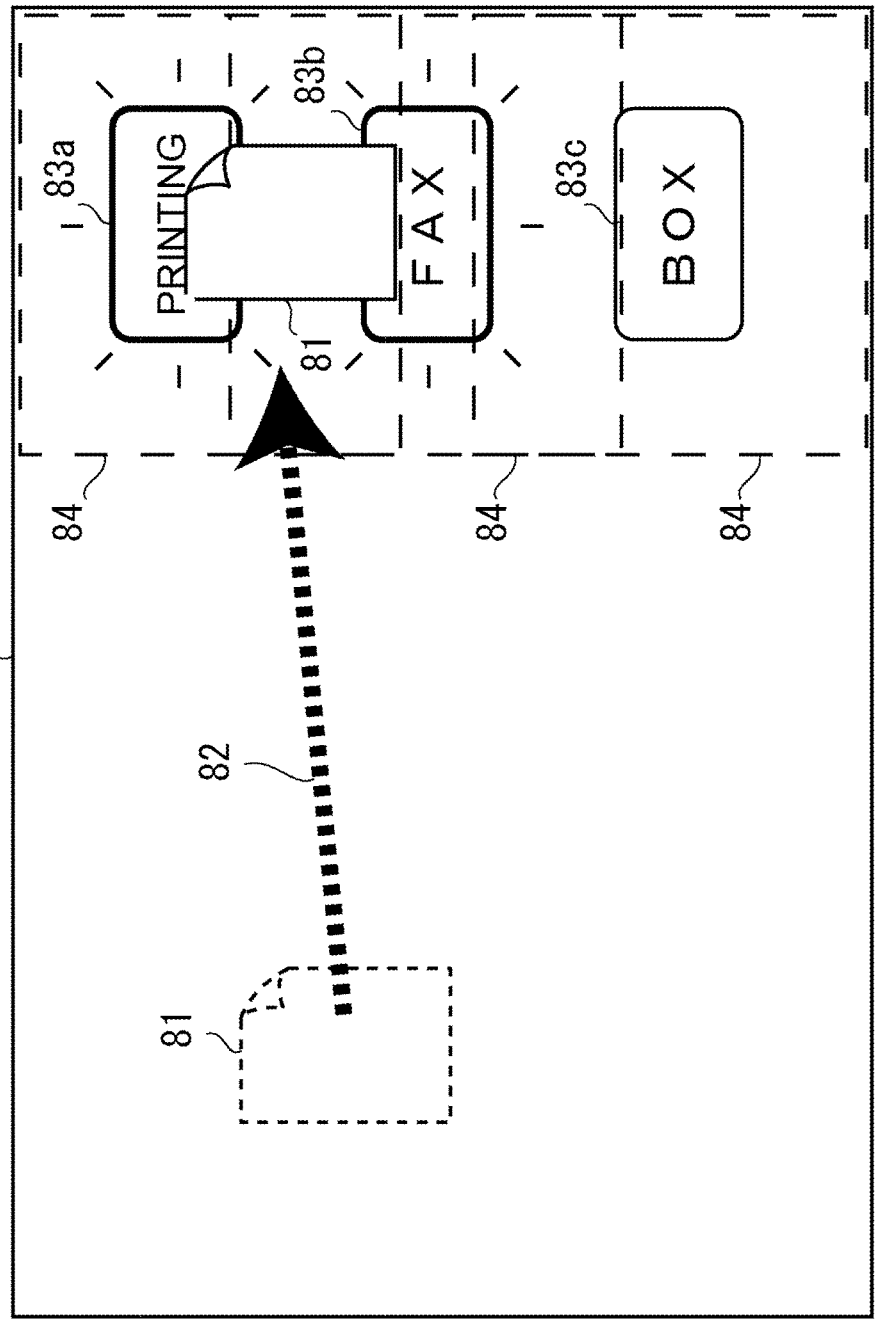
FIG. 5 shows another example of the operation screen displayed on the operation panel illustrated in FIG. 1.

For example, by the above-mentioned embodiment, if there are a plurality of movement destination candidates, the case where image icon 81 is stopped near the plurality of movement destination candidates is explained. However, it may be stop, where image icon 81 is piled up on the plurality of functional folder 83 of the plurality of movement destination candidates. For example, as shown in FIG. 5, a case where movement destination candidates are printing folder 83*a* and FAX folder 83*b* is explained. Image icon 81 stops in the state where it overlaps with printing folder 83*a* and FAX folder 83*b*. In this case, printing folder 83*a* or FAX folder 83*b* can be chosen only by flicking to above or bottom in FIG. 5.

Figure 6:
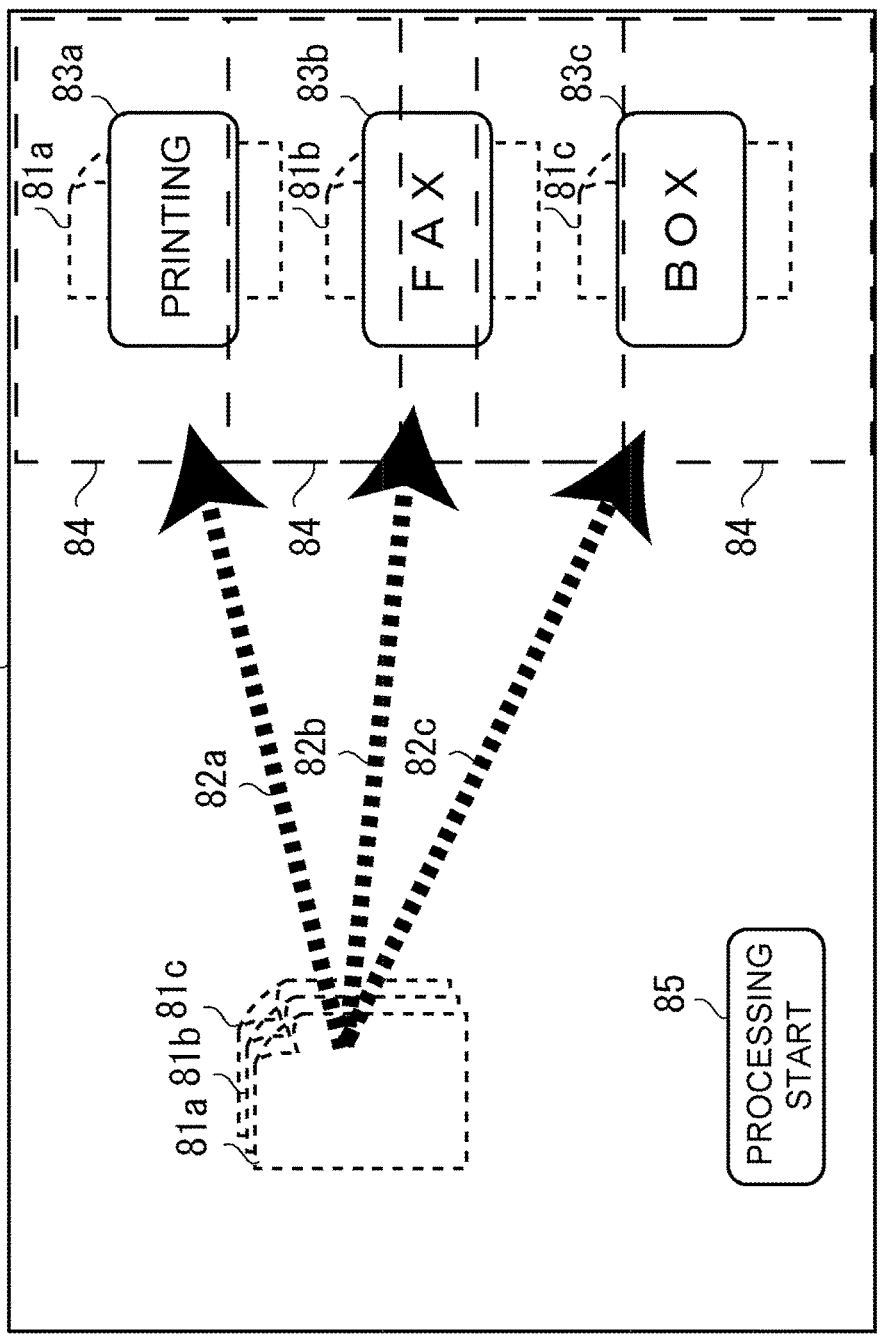
FIG. 6 shows other example of the operation screen displayed on the operation panel indicated in FIG. 1.

Also, as shown in FIG. 6, a plurality of image icon 81*a-c* may be displayed on operation screen 86. Also, by flicking the plurality of image icon 81*a-c* to flick direction 82*a-c*, respectively, they can be stored in printing folder 83*a*, FAX folder 83*b*, and BOX folder 83*c*, respectively. Also, an image data stored in functional folder 83 may not to be processed until "processing start" button 85 is pressed. In this case, if "processing start" button 85 is pressed, the image data stored in functional folder 83 is processed. If an image data is stored in functional folder 83 and functional folder 83 is double-tapped or the like, the image data may be displayed.

Also, if there are a plurality of movement candidates, the movement speed of image icon 81 may be reduced near the plurality of movement candidates. Also, in a plurality of movement candidates, color of a functional folder 83 of a movement candidate, which image icon 81 is finally stored, may be highlighted in red or the like. Also, according to functional folder 83, stop or non-stop for image icon 81, movement speed, or the like, may be changed. Also, for movement itself being not accepted, it can be setup a movement formations of image icon 81. For example, in printing folder 83*a*, FAX folder 83*b*, or the like, if printing image data immediately or transmitting FAX are troubled, this can be set up. Also, it can be set up about a case when image icon 81 is stopped near a plurality of movement candidates and other image icons 81 is moved towards the plurality of movement candidates. In this case, image icon 81 having moved later may be put in order next to previously stopped image icon 81 and stops.

Also, if image icon 81 stopped near a plurality of movement candidates is re-flicked and stored in either of the plurality of movement candidates, a priority can be set up. Operation processing part 141 may set up the priority of functional folder 83 that stores image icon 81 more highly than the priority of other functional folders 83. If there is a plurality of movement candidates again in the next time and there is functional folder 83 in which the priority is set up highly in a plurality of movement candidates, operation processing part 141 performs enlarged displays functional folder 83 in which the priority is set up more highly than functional folder 83 of the other movement candidates, or the like. Thereby, a display style may be changed so that it may be noticeable. Also, in this time, if functional folder 83 in which the priority set up more highly is not chosen by re-flicking of image icon 81, operation processing part 141 may cancel the setup of the priority of this functional folder 83. In this case, operation processing part 141 may restores it to a standard priority.

In the present embodiment, although image forming apparatus 100 is explained to an example, it is not limited to this. That is, it is applicable to a touch panel apparatus provided with touch panel 112. For example, it is applicable to a portable terminals provided with touch panel 112, such as a mobile phone, a smart phone, and a tablet terminal, or the like.

What is claimed is:
1. A touch panel apparatus comprising:
a microcomputer;
a memory part that stores a control program to control the touch panel apparatus; and
a touch panel; wherein the microcomputer functions as a control part that performs operation control by executing the control program;

the touch panel displays a movement source icon being movable in a flick direction by flick operation that slides quickly so that a display surface is flipped and a plurality of movement destination icons being a movement destination of the movement source icon;

for each of the plurality of movement destination icons, a decision range for determining whether it is a movement destination icon corresponding to the flick direction is provided by the control part;

each of the decision ranges is set to an outer circumference of the respective movement destination icon and is separated only a specific distance from the respective movement destination icon;

the control part, when the movement source icon is flicked, acquires a flick direction and determines whether or not there is a decision range in the acquired flick direction, and when there is the decision range in the acquired flick direction, acquires the movement destination icon having the decision range as a movement destination candidate of the movement source icon, makes the movement source icon move to the acquired flick direction, and determines whether or not there is a plurality of movement destination candidates;

the control part, when there is the plurality of movement destination candidates, stops the movement source icon near the plurality of movement destination candidates, and waits until the movement source icon is re-flicked, and the control part, when there is one movement destination candidate, moves the movement source icon until overlapping with the movement destination icon of the movement destination candidate, and processes a function corresponding to the movement destination icon.

2. The touch panel apparatus according to claim 1, wherein
the specific distance is allowable to be set by a user.

3. The touch panel apparatus according to claim 1, wherein
the control part, if there is the plurality of movement destination candidates, reduces movement speed of the movement source icon near the plurality of movement destination candidates.

4. The touch panel apparatus according to claim 1, wherein
the control part, if there is the plurality of movement destination candidates, enlarged displays the plurality of the movement destination candidates.

5. The touch panel apparatus according to claim 1, wherein
the control part,
when there is the plurality of movement destination candidates and the movement source icon moves to either of the plurality of the movement destination candidates, a priority of the movement destination icon that the movement source icon moves is set higher than other movement destination icons, and when there is the movement destination icon that is set higher priority in the plurality of movement destination candidates in a next time, a display style of the movement destination icon that is set the higher priority is highlighted rather than the other movement destination candidates.

6. The touch panel apparatus according to claim 1, wherein
a movement formation of the movement source icon can be set according to the movement destination icon.

7. The touch panel apparatus according to claim 1, wherein
a processing start button is provided in the touch panel, and
when the processing start button is touched in a state after the movement source icon is moved to the movement destination icon, data corresponding to the movement destination icon is processed by function corresponding to the movement destination icon.

8. An image forming apparatus having the touch panel apparatus according to claim 1.

9. An operation processing method executed by a touch panel apparatus having a touch panel, comprising the steps of:

displaying on the touch panel a movement source icon being movable in a flick direction by flick operation that slides quickly so that a display surface is flipped, and a plurality of movement destination icons being a movement destination of the movement source icon;

setting each of a plurality of decision ranges to an outer circumference of a respective movement destination icon of the plurality of movement destination icons such that each of the decision ranges is separated only a specific distance from the respective movement destination icon;

acquiring, when the movement source icon is flicked, a flick direction and determining whether or not there is a decision range in the acquired flick direction, and when there is the decision range in the acquired flick direction, acquiring the movement destination icon having the decision range as a movement destination candidate of the movement source icon, making the movement source icon move to the acquired flick direction, and determining whether or not there is a plurality of movement destination candidates; and stopping, when there is the plurality of movement destination candidates, the movement source icon near the plurality of movement destination candidates, and waiting until the movement source icon is re-flicked, and when there is one movement destination candidate, moving the movement source icon until overlapping with the movement destination icon of the movement destination candidate, and processing a function corresponding to the movement destination icon.

* * * * *